United States Patent
Frota de Souza Filho et al.

(10) Patent No.: US 10,071,430 B2
(45) Date of Patent: Sep. 11, 2018

(54) CUTTING HEAD, ROTARY TOOL AND SUPPORT FOR THE ROTARY TOOL AND FOR THE ACCOMMODATION OF THE CUTTING HEAD

(71) Applicant: Kennametal Inc., Latrobe, PA (US)

(72) Inventors: Ruy Frota de Souza Filho, Latrobe, PA (US); Juergen Schwaegerl, Vohenstrauss (DE); Horst Jaeger, Nürnberg (DE); Berthold Zeug, Fuerth (DE); Alan Joseph Bookheimer, Greensburg, PA (US); Nicholas Joseph Henry, Greensburg, PA (US)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 14/877,685

(22) Filed: Oct. 7, 2015

(65) Prior Publication Data
US 2017/0100784 A1    Apr. 13, 2017

(51) Int. Cl.
*B23B 51/02* (2006.01)
*B23B 51/06* (2006.01)

(52) U.S. Cl.
CPC .............. *B23B 51/02* (2013.01); *B23B 51/06* (2013.01); *B23B 2251/02* (2013.01); *Y10T 408/892* (2015.01); *Y10T 408/907* (2015.01); *Y10T 408/909* (2015.01)

(58) Field of Classification Search
CPC ............. Y10T 408/907; Y10T 408/909; Y10T 408/9093; Y10T 408/9095; Y10T 408/9097; Y10T 408/9098; Y10T 408/90987; Y10T 408/90993;
(Continued)

(56) References Cited

U.S. PATENT DOCUMENTS

| 22,394 A | 12/1858 | White |
| 40,297 A | 10/1863 | Wakefield |
| 44,915 A | 11/1864 | Baker |

(Continued)

FOREIGN PATENT DOCUMENTS

| AT | 9431 B | 10/1902 |
| CN | 1160370 A | 9/1997 |

(Continued)

OTHER PUBLICATIONS

Jul. 13, 2016—First Office Action.
(Continued)

*Primary Examiner* — Nicole N Ramos
(74) *Attorney, Agent, or Firm* — Ian K. Samways

(57) ABSTRACT

A cutting head is formed for insertion into a support in a modular rotary tool, in particular a drill. The coupling head has a coupling having torque surfaces and clamping surfaces on its outer periphery. The coupling pin is divided into a front pin part and a rear pin part. The front pin part is defined by a circumferential groove. Stop surfaces for an axial pullout safety are formed in the transition area between the two the front pin part and the rear pin part. The torque surfaces and the clamping surfaces are arranged in different pin parts. For example, the clamping surfaces are preferably formed on the front pin part and the torque surfaces are preferably formed in the rear pin part.

20 Claims, 4 Drawing Sheets

(58) Field of Classification Search
CPC . Y10T 408/892; B23B 51/02; B23B 2251/02; B23B 2251/50
See application file for complete search history.

(56) References Cited

U.S. PATENT DOCUMENTS

| | | | |
|---|---|---|---|
| 273,388 A | 3/1883 | Peatt |
| 273,391 A | 3/1883 | Thrasher |
| 329,660 A | 11/1885 | Lord |
| 658,216 A | 9/1900 | Munger |
| 690,093 A | 12/1901 | Beach |
| 756,339 A | 4/1904 | Down |
| 932,071 A | 8/1909 | Urbscheit |
| 1,461,548 A | 7/1923 | West |
| 2,158,120 A | 5/1939 | Hirschberg |
| 2,289,683 A | 7/1942 | Malone |
| 2,294,969 A | 9/1942 | Engvall |
| 3,140,749 A | 7/1964 | Dionisotti |
| 3,153,356 A | 10/1964 | Dearborn |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller |
| 3,548,688 A | 12/1970 | Kuch |
| 3,765,496 A | 10/1973 | Flores |
| 4,293,253 A | 10/1981 | Ott |
| D262,219 S | 12/1981 | Lassiter |
| D263,598 S | 3/1982 | Lassiter |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,561,812 A | 12/1985 | Linden |
| 4,744,704 A | 5/1988 | Galvefors |
| 4,844,643 A | 7/1989 | Icks |
| 5,024,563 A | 6/1991 | Randall |
| 5,114,286 A | 5/1992 | Calkins |
| 5,154,549 A | 10/1992 | Isobe |
| 5,154,550 A | 10/1992 | Isobe |
| 5,228,812 A | 7/1993 | Noguchi |
| 5,346,335 A | 9/1994 | Harpaz |
| 5,429,199 A | 7/1995 | Sheirer et al. |
| 5,452,971 A | 9/1995 | Nevills |
| 5,509,761 A | 4/1996 | Grossman |
| 5,634,747 A | 6/1997 | Tukala |
| 5,649,794 A | 7/1997 | Kress |
| 5,685,671 A | 11/1997 | Packer |
| 5,769,577 A | 6/1998 | Boddy |
| 5,791,838 A | 8/1998 | Hamilton |
| 5,863,162 A | 1/1999 | Karlsson |
| 5,904,455 A | 5/1999 | Krenzer |
| 5,957,631 A * | 9/1999 | Hecht | B23B 51/00 408/144 |
| 5,971,673 A | 10/1999 | Berglund |
| 5,980,166 A | 11/1999 | Ogura |
| 5,988,953 A | 11/1999 | Berglund |
| 5,996,714 A | 12/1999 | Massa et al. |
| 6,000,000 A | 12/1999 | Hawkins |
| 6,012,881 A | 1/2000 | Scheer |
| 6,045,301 A | 4/2000 | Kammermeier |
| 6,059,492 A | 5/2000 | Hecht |
| 6,071,045 A | 6/2000 | Janness |
| 6,109,841 A | 8/2000 | Johne |
| 6,123,488 A | 9/2000 | Kasperik |
| 6,276,879 B1 | 8/2001 | Hecht |
| 6,447,218 B1 | 9/2002 | Lagerberg |
| 6,481,938 B2 | 11/2002 | Widin |
| 6,485,235 B1 | 11/2002 | Mast et al. |
| 6,506,003 B1 | 1/2003 | Erickson |
| 6,514,019 B1 | 2/2003 | Schulz |
| 6,524,034 B2 | 2/2003 | Eng |
| 6,530,728 B2 | 3/2003 | Eriksson |
| 6,582,164 B1 * | 6/2003 | McCormick | B23B 31/113 408/144 |
| 6,595,305 B1 | 7/2003 | Dunn et al. |
| 6,595,727 B2 | 7/2003 | Arvidsson |
| 6,626,614 B2 | 9/2003 | Nakamura |
| 6,840,717 B2 | 1/2005 | Eriksson |
| 6,848,561 B2 | 2/2005 | Bao |
| 7,008,150 B2 | 3/2006 | Krenzer |
| 7,048,480 B2 * | 5/2006 | Borschert | B23B 51/02 408/144 |
| 7,070,367 B2 | 7/2006 | Krenzer |
| 7,114,892 B2 | 10/2006 | Hansson |
| 7,125,207 B2 | 10/2006 | Craig |
| 7,134,816 B2 | 11/2006 | Brink |
| 7,189,437 B2 | 3/2007 | Kidd |
| 7,237,985 B2 | 7/2007 | Leuze |
| 7,306,410 B2 | 12/2007 | Borschert |
| 7,309,196 B2 | 12/2007 | Ruy Frota de Souza |
| 7,311,480 B2 | 12/2007 | Heule |
| 7,360,974 B2 | 4/2008 | Borschert et al. |
| 7,377,730 B2 | 5/2008 | Hecht |
| 7,407,350 B2 | 8/2008 | Hecht et al. |
| 7,431,543 B2 | 10/2008 | Buettiker |
| 7,467,915 B2 | 12/2008 | de Souza |
| 7,559,382 B2 | 7/2009 | Koch |
| 7,591,617 B2 | 9/2009 | Borschert |
| D607,024 S | 12/2009 | Dost et al. |
| 7,625,161 B1 | 12/2009 | Ruy Frota de Souza |
| 7,677,842 B2 | 3/2010 | Park |
| 7,740,472 B2 | 6/2010 | Delamarche |
| 7,775,751 B2 | 8/2010 | Cohen |
| 7,832,967 B2 | 11/2010 | Borschert |
| D632,320 S | 2/2011 | Chen et al. |
| D633,534 S | 3/2011 | Chen et al. |
| 7,972,094 B2 | 7/2011 | Men |
| RE42,644 E | 8/2011 | Mats |
| 7,997,832 B2 | 8/2011 | Prichard |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson et al. |
| 8,366,358 B2 | 2/2013 | Borschert |
| 8,376,669 B2 | 2/2013 | Jaeger |
| 8,430,609 B2 | 4/2013 | Frejd |
| 8,449,227 B2 | 5/2013 | Danielsson |
| 8,534,966 B2 | 9/2013 | Hecht |
| 8,556,552 B2 | 10/2013 | Hecht |
| 8,596,935 B2 | 12/2013 | Fang |
| 8,678,722 B2 | 3/2014 | Aare |
| 8,678,723 B2 | 3/2014 | Osawa |
| RE44,915 E | 5/2014 | de Souza |
| 8,721,235 B2 | 5/2014 | Kretzschmann |
| D708,034 S | 7/2014 | Huang |
| 8,784,018 B2 | 7/2014 | Pabel |
| 8,784,019 B2 | 7/2014 | Pabel |
| D711,719 S | 8/2014 | Debaker |
| 8,807,888 B2 | 8/2014 | Borschert |
| 8,882,413 B2 | 11/2014 | Hecht |
| 8,931,982 B2 | 1/2015 | Osawa |
| 8,992,142 B2 | 3/2015 | Hecht |
| 9,028,180 B2 | 5/2015 | Hecht |
| 9,050,659 B2 | 6/2015 | Schwaegerl |
| 9,073,128 B2 | 7/2015 | MacK |
| 9,079,255 B2 | 7/2015 | Jager |
| 9,162,295 B2 | 10/2015 | Pabel |
| D742,714 S | 11/2015 | King, Jr. et al. |
| D742,948 S | 11/2015 | Kenno et al. |
| 9,180,650 B2 | 11/2015 | Fang |
| 9,205,498 B2 | 12/2015 | Jaeger |
| 9,248,512 B2 | 2/2016 | Aare |
| 9,296,049 B2 | 3/2016 | Schwaegerl |
| 9,302,332 B2 | 4/2016 | Scanlon |
| 9,371,701 B2 | 6/2016 | Cox et al. |
| 9,481,040 B2 | 11/2016 | Schwaegerl |
| 9,498,829 B2 | 11/2016 | Zabrosky |
| D798,921 S | 10/2017 | Frota De Souza Filho |
| D798,922 S | 10/2017 | Frota De Souza Filho |
| 2001/0033780 A1 | 10/2001 | Berglund |

(56) References Cited

U.S. PATENT DOCUMENTS

| | | | |
|---|---|---|---|
| 2002/0159851 A1* | 10/2002 | Krenzer | B23B 51/02 408/230 |
| 2002/0168239 A1 | 11/2002 | Mast | |
| 2002/0195279 A1 | 12/2002 | Bise et al. | |
| 2003/0039523 A1 | 2/2003 | Kemmer | |
| 2003/0091402 A1 | 5/2003 | Lindblom | |
| 2004/0240949 A1 | 12/2004 | Pachao-Morbitzer | |
| 2005/0084352 A1 | 4/2005 | Had | |
| 2005/0135888 A1 | 6/2005 | Stokey et al. | |
| 2006/0072976 A1 | 4/2006 | Frota de Souza | |
| 2006/0093449 A1 | 5/2006 | Hecht et al. | |
| 2008/0003072 A1 | 1/2008 | Kim | |
| 2008/0175676 A1 | 7/2008 | Prichard | |
| 2008/0175677 A1 | 7/2008 | Prichard | |
| 2008/0181741 A1 | 7/2008 | Borschert | |
| 2008/0193231 A1 | 8/2008 | Jonsson | |
| 2008/0193237 A1 | 8/2008 | Men | |
| 2009/0044986 A1 | 2/2009 | Jaeger et al. | |
| 2009/0067942 A1 | 3/2009 | Tanaka | |
| 2009/0071723 A1 | 3/2009 | Mergenthaler | |
| 2009/0116920 A1* | 5/2009 | Bae | B23B 51/02 408/227 |
| 2009/0123244 A1 | 5/2009 | Buettiker | |
| 2009/0311060 A1 | 12/2009 | Frejd | |
| 2010/0021253 A1 | 1/2010 | Frejd | |
| 2010/0092259 A1 | 4/2010 | Borschert | |
| 2010/0143059 A1 | 6/2010 | Hecht | |
| 2010/0247255 A1 | 9/2010 | Nitzsche | |
| 2010/0266357 A1 | 10/2010 | Kretzschmann | |
| 2010/0272529 A1 | 10/2010 | Rozzi | |
| 2010/0307837 A1 | 12/2010 | King | |
| 2010/0322723 A1 | 12/2010 | Danielsson | |
| 2010/0322728 A1 | 12/2010 | Aare | |
| 2010/0322729 A1 | 12/2010 | Päbel | |
| 2010/0322731 A1 | 12/2010 | Pare Magnus | |
| 2011/0020072 A1 | 1/2011 | Chen | |
| 2011/0020073 A1 | 1/2011 | Chen | |
| 2011/0020077 A1 | 1/2011 | Fouquer | |
| 2011/0020086 A1 | 1/2011 | Borschert | |
| 2011/0027021 A1 | 2/2011 | Nelson | |
| 2011/0081212 A1 | 4/2011 | Spichtinger | |
| 2011/0097168 A1 | 4/2011 | Jager et al. | |
| 2011/0110735 A1 | 5/2011 | Klettenheimer | |
| 2011/0110739 A1 | 5/2011 | Frisendahl | |
| 2011/0168453 A1 | 7/2011 | Kersten | |
| 2011/0229277 A1 | 9/2011 | Hoffer | |
| 2011/0236145 A1 | 9/2011 | Päbel | |
| 2011/0299944 A1 | 12/2011 | Hofermann | |
| 2011/0318128 A1 | 12/2011 | Schwägerl et al. | |
| 2012/0003056 A1 | 1/2012 | Jaeger | |
| 2012/0014760 A1 | 1/2012 | Glimpel | |
| 2012/0082518 A1 | 4/2012 | Dougl | |
| 2012/0087746 A1 | 4/2012 | Fang | |
| 2012/0087747 A1 | 4/2012 | Fang | |
| 2012/0099937 A1 | 4/2012 | Osawa | |
| 2012/0121347 A1 | 5/2012 | Osawa | |
| 2012/0308319 A1 | 12/2012 | Sampath | |
| 2012/0315101 A1 | 12/2012 | Osawa | |
| 2013/0183107 A1 | 7/2013 | Fang | |
| 2013/0183112 A1* | 7/2013 | Schwagerl | B23B 51/02 408/226 |
| 2013/0209189 A1 | 8/2013 | Borschert | |
| 2013/0223943 A1 | 8/2013 | Gey | |
| 2013/0259590 A1 | 10/2013 | Shaheen | |
| 2013/0266389 A1 | 10/2013 | Hecht | |
| 2014/0023449 A1 | 1/2014 | Jonsson et al. | |
| 2014/0255115 A1 | 9/2014 | Zabrosky | |
| 2014/0255116 A1 | 9/2014 | Myers | |
| 2014/0301799 A1 | 10/2014 | Schwaegerl | |
| 2014/0321931 A1 | 10/2014 | Gey | |
| 2014/0348602 A1 | 11/2014 | Schwaegerl | |
| 2015/0063931 A1 | 3/2015 | Wu | |
| 2015/0104266 A1 | 4/2015 | Guter | |
| 2015/0174671 A1 | 6/2015 | Maurer | |
| 2015/0266107 A1 | 9/2015 | Gonen | |
| 2015/0273597 A1 | 10/2015 | Aliaga | |
| 2015/0298220 A1 | 10/2015 | Ach | |
| 2015/0321267 A1 | 11/2015 | Takai | |
| 2015/0328696 A1 | 11/2015 | Wang | |
| 2016/0001379 A1 | 1/2016 | Kauper | |
| 2016/0001381 A1 | 1/2016 | Lach | |
| 2016/0016236 A1 | 1/2016 | Evans | |
| 2016/0031016 A1 | 2/2016 | Takai | |
| 2016/0059323 A1 | 3/2016 | Christine | |
| 2016/0063926 A1 | 3/2016 | Zhang | |
| 2016/0207122 A1 | 7/2016 | Chen | |
| 2016/0229017 A1 | 8/2016 | Guy | |
| 2016/0263663 A1 | 9/2016 | Schwaegerl | |
| 2016/0263664 A1 | 9/2016 | Son | |
| 2016/0263666 A1 | 9/2016 | Myers | |
| 2016/0311035 A1 | 10/2016 | Peng | |

FOREIGN PATENT DOCUMENTS

| | | |
|---|---|---|
| CN | 1204976 A | 1/1999 |
| CN | 1258240 A | 6/2000 |
| CN | 2438535 | 7/2001 |
| CN | 1616170 A | 5/2005 |
| CN | 1689740 A | 11/2005 |
| CN | 101048251 A | 10/2007 |
| CN | 100455390 C | 1/2009 |
| CN | 101605622 A | 12/2009 |
| CN | 101610866 A | 12/2009 |
| CN | 102006958 A | 4/2011 |
| CN | 102307693 A | 1/2012 |
| CN | 102310214 A | 1/2012 |
| CN | 104588739 A | 5/2015 |
| CN | 104759664 A | 7/2015 |
| CN | 204565232 U | 7/2015 |
| CN | 104759664 A | 8/2015 |
| CN | 204545517 | 8/2015 |
| CN | 204545517 U | 8/2015 |
| CN | 204565232 | 8/2015 |
| CN | 106825693 A | 6/2017 |
| DE | 94340 | 9/1896 |
| DE | 94340 | 10/1897 |
| DE | 384720 C | 11/1923 |
| DE | 524677 | 5/1931 |
| DE | 118806 | 9/1984 |
| DE | 3733298 C2 | 4/1992 |
| DE | 19605157 | 9/1996 |
| DE | 19543233 | 5/1997 |
| DE | 29809638 U1 | 8/1998 |
| DE | 28809638 | 9/1998 |
| DE | 19945097 | 3/2001 |
| DE | 20204818 | 6/2002 |
| DE | 20204848 | 6/2002 |
| DE | 102004022747 A1 | 11/2005 |
| DE | 102007044095 A1 | 3/2009 |
| DE | 112009002001 T5 | 2/2013 |
| DE | 102012200680 | 7/2013 |
| DE | 102012200690 A1 | 7/2013 |
| DE | 102012212146 | 1/2014 |
| DE | 102013205889 | 5/2014 |
| DE | 102013209371 A1 | 11/2014 |
| DE | 102015106374 A1 | 10/2016 |
| EP | 118806 | 9/1984 |
| EP | 0599393 B1 | 2/1996 |
| EP | 1136161 | 9/2001 |
| EP | 813459 | 7/2003 |
| EP | 1476269 | 10/2009 |
| EP | 1996358 | 11/2011 |
| EP | 2524755 | 11/2012 |
| EP | 2551046 A1 | 1/2013 |
| FR | 907980 | 3/1946 |
| GB | 17961 | 12/1915 |
| GB | 1395855 | 5/1975 |
| JP | 5537209 | 3/1980 |
| JP | 11019812 A | 1/1999 |
| JP | 2002501441 A | 1/2002 |
| JP | 2002113606 A | 4/2002 |
| JP | 2003291044 A | 10/2003 |
| JP | 2004255533 A | 9/2004 |
| JP | 2005118940 | 5/2005 |

(56) References Cited

FOREIGN PATENT DOCUMENTS

| | | | |
|---|---|---|---|
| JP | 2005169542 | | 6/2005 |
| JP | 2006167871 | A | 6/2006 |
| JP | 2008500195 | A | 1/2008 |
| JP | 2011036977 | A | 2/2011 |
| JP | 6211769 | | 9/2017 |
| WO | 8403241 | | 8/1984 |
| WO | WO1984003241 | | 8/1984 |
| WO | WO9627469 | | 9/1996 |
| WO | 9853943 | | 12/1998 |
| WO | WO03031104 | A1 | 4/2003 |
| WO | 2007107294 | | 9/2007 |
| WO | WO2007107294 | A1 | 9/2007 |
| WO | WO2008072840 | A2 | 6/2008 |
| WO | WO2009128775 | A1 | 10/2009 |
| WO | WO2010102793 | A1 | 9/2010 |
| WO | 2015/064904 | A1 | 9/2014 |
| WO | WO 2015064904 | A1 | 5/2015 |

OTHER PUBLICATIONS

Oct. 25, 2016 Office action (3 months).
Jun. 27, 2017 Office action (3 months).
Jul. 14, 2017 Office action (3 months).
Hribal, Hillary, Mar. 10, 2017 Office action (3 months).
Mar. 22, 2017 First office action.
Apr. 6, 2017 Second Office Action.
Apr. 1, 2017 First office action.
May 9, 2017 Second Office Action.
Apr. 19, 2017 First office action.
Hribal, Hillary, May 25, 2017 Office action (3 months).
Sep. 2, 2015 First office action.
Jul. 7, 2015 Office action (3 months).
Jul. 16, 2015 International Search Report Transmitted.
Oct. 22, 2015 Office action (3 months).
Nov. 3, 2015 Final Office Action.
Nov. 6, 2015 Final Office Action.
Oct. 12, 2015 First office action.
Dec. 8, 2015 Office action (3 months).
Feb. 23, 2016 Office action (3 months).
May 13, 2014—Office Action.
Mar. 7, 2016 Final Office Action.
Mar. 23, 2016 First office action.
Apr. 12, 2016 Second Office Action.
Jun. 16, 2016 Office action (3 months).
Jul. 29, 2016 Office action (3 months).
Sep. 27, 2016 Office action (3 months).
Oct. 20, 2016 Office action (3 months).
Nov. 15, 2016 EPO Notification.
Nov. 23, 2016 Final Office Action.
Nov. 16, 2016 Second Office Action.
Dec. 30, 2016 Final Office Action.
Mar. 21, 2017 Office action (3 months).
Apr. 6, 2017 First office action.
Sep. 6, 2017 Final Office Action.
Sep. 19, 2017 Final Office Action.
Dec. 1, 2017 Second Office Action.
Dec. 29, 2017 Office action (3 months).
Dec. 18, 2017 Second Office Action.
Nov. 17, 2017 First Office Action.
Apr. 8, 2016 Office action (2 months).
Jan. 11, 2018 First Office Action.
Oct. 25, 2016 Office action (3 months)

\* cited by examiner

CUTTING HEAD, ROTARY TOOL AND SUPPORT FOR THE ROTARY TOOL AND FOR THE ACCOMMODATION OF THE CUTTING HEAD

FIELD OF THE INVENTION

The invention relates to a rotary tool, in particular a drill, with such a cutting head, as well as a support for such a rotary tool and for accommodating the cutting head.

BACKGROUND OF THE INVENTION

Drills having replaceable cutting tips mounted on shanks are known. The cutting heads and shanks display continuous and complementing configuration as fluted drills. To this end, each shank has structure for retaining and rotating an associated cutting head. The associated cutting head has complementing structure for being retained and rotated by the shank. While these devices will operate under some circumstances, closer analysis reveals that their useful lives are potentially unduly limited. More specifically, the retaining and drive structure of the shank is subject to deformation and failure during its service life due to concentration of stresses imposed during when drilling on uneven or angled surfaces.

A conventional cutting head and a rotary tool can be derived, for example, from WO 2008/072840 A2 or from the applicant's applications PCT/EP 2015/056288 or DE 10 2015 211744.8, which were unpublished as of the filing date.

The rotary tool is a so-called "modular" rotary tool, which extends in the axial direction along an axis of rotation and has two coupling parts, namely a support and a cutting head. The cutting head is interchangeably mounted on the support. To that end, the support typically has on its front side two fastening bars that face each other and are separated by flutes that limit accommodation of pins. Inserted into this pin receptacle is a coupling pin of the cutting head. This is accomplished by rotating the cutting head around the axis of rotation in relation to the support. This rotation typically forms a clamping connection between the cutting head and the support, clamping together the two coupling parts. At the same time, no other fastening elements, for example screws or the like, are arranged. The fastening by clamping is accomplished between the outer peripheral surfaces of the coupling pin and the inner peripheral surfaces of the pin receptacle.

Also arranged are two corresponding surfaces for transmitting torque from the support to the cutting head. These torque driving surfaces are referred to below in brief as torque surfaces.

Another similar modular rotary tool can be derived from DE 10 2012 200 690 A1.

Modular rotary tools can be divided into two different types. In a first type, like the one derived from, for example, WO 2008/072840 A2, the torque surfaces extend outward radially up to an outermost periphery of the cutting head, also called "drill ridges." According to a second variant, like the one described, for example, in the two unpublished applications cited above or also in DE 10 2012 200 690 A1, the torque surfaces are formed directly on the coupling pin as its outer peripheral surfaces, which interact with corresponding inner peripheral surfaces of the fastening bars.

Both the torque surfaces and the clamping surfaces of the cutting head and of the support are installed in pairs opposite each other in a coupled state when the cutting head is thus inserted into the support. At the same time, the corresponding clamping surfaces form in each instance a press fit; i.e., in the area of the clamping surfaces, the coupling pin has an allowance vis-à-vis the pin receptacle.

In some of the applications cited above, formed for an axial pullout safety on each coupling pin are roughly horizontal stop surfaces that interact with corresponding stop surfaces of the support, in order to thus guarantee a positive fit in the axial direction for the cutting head. This positive fit prevents the cutting head from being pulled out from the support in an axial direction, for example when the rotary tool is withdrawn from the drill hole after a drilling procedure.

In WO 2008/072840 A2, a circumferential groove in the form of a recess is formed to form this axial pullout safety on the coupling pin. In a similar manner, in PCT/EP 2015/056288 or DE 10 2015 211744.8, the stop surface is formed by radial grinding in the form of recesses.

In DE 10 2012 200 690 A1, on the other hand, the coupling pin is formed to form a rear grip for an axial, dovetail-type pullout safety.

SUMMARY OF THE INVENTION

Based on the above, the problem of the invention is to provide a cutting head, a modular rotary tool and a support, in which the different functions of the torque drive, the fastening by clamps and the axial pullout safety are reliably realized.

According to the invention, the problem can be solved by a cutting head, rotary tool and support with features found in the independent claims. Advantageous developments are described in the dependent claims.

The preferred designs and advantages of the cutting head, rotary tool and support are in each instance alternatingly transferable.

The rotary tool is generally a so-called "modular" rotary tool that extends in an axial direction along an axis of rotation and which has two coupling parts, namely the support and the cutting head, wherein the cutting head and the support can be interchangeably attached to one another.

In operation, the rotary tool rotates around the axis of rotation in the direction of rotation or peripheral direction. The rotary tool is in particular a drill; thus, the cutting head is in particular a drill head. However, the invention is not limited to use with a drill. The rotary tool can also be, for example, a milling tool or another type of rotating tool, for example a reamer or the like.

The cutting head generally has a front cutting part, to which a coupling pin is attached contrary to the axial direction. Typically formed on the cutting part are two main cutting edges that are connected to each other, in particular in the center surface, by means of a chisel edge. Attached to each main cutting edge, contrary to an intended direction of rotation is a free surface, which typically merges into a clamping slot associated with the next main cutting edge.

For the interchangeable fastening of the cutting head, the front of the support generally has two opposite-facing fastening bars separated by flutes that limit a coupling pin receptacle. The coupling pin of the cutting head can be inserted to clamp into this coupling pin receptacle. Preferably, the cutting head is fastened exclusively by the fastening by clamps. The insertion is made by rotating the cutting head around the axis of rotation in relation to the support. This forms the desired clamping connection between the cutting head and the support, so that the two coupling parts are held together by clamping.

The coupling pin receptacle of the support has inner peripheral surfaces and the coupling pin of the cutting head has outer peripheral surfaces that mutually interact with one another. Formed on each inner peripheral surface and each outer peripheral surface are corresponding torque surfaces for transmitting torque on one side and corresponding clamping surfaces for transmitting a radial clamping force on the other side. These associated surfaces lie against each other in pairs in the connected state. The torque surfaces and the clamping surfaces form function surfaces for the functions of transmitting torque and of clamping.

Also formed for an axial pullout safety are stop surfaces that correspond to the coupling pin receptacle and to the coupling pin, which are effective in the axial direction for an axial pullout safety; i.e., in the joined state they are positively covered in the axial direction. The coupling pin is divided into a front pin part and a rear pin part. The front pin part comprises a circumferential groove that form the stop surfaces. To form the groove, during manufacture in particular with a grinding wheel, an indentation extending in a radial direction is made by grinding. Thus, as a result of the groove, a quasi-surface is formed between the two pin parts, forming the stop surface.

For the support, to form the stop surfaces, an overhang is formed that corresponds to each fastening bar, which overhang in the joined state thus overlaps the rear pin part and engages the groove. Corresponding to the coupling pin, the coupling pin receptacle also has a front receiving part and a rear receiving part.

The terms "front" and "rear" refer to the axial direction. The axial direction extends in the direction from the support up to the cutting head. The "front" means the part in the direction of the cutting head and the "rear" means the part in the direction of the support.

The function surfaces are generally formed on the outer peripheral surfaces of the coupling pins or on the inner peripheral surfaces of the coupling pin receptacle. The coupling is a type of coupling in which the torque transmission surfaces are arranged on the interior side; i.e., they are hemmed in on the periphery by the fastening bars. The torque surfaces thus specifically do not extend to the outermost periphery of the cutting head; i.e., not up to the rear of the rotary tool, which typically forms the periphery-side boundary surface of the rotary tool.

At least one type of function surfaces, in particular the torque surface, is formed on the rear pin part. Because this rear pin part has a greater diameter than the groove, the rear pin part is more stable and because of its greater radial extension, it is also better suited for the transmission of forces.

An appropriate further development also provides that the function surfaces, i.e. the torque surfaces and the clamping surfaces, are divided between the two parts (pin parts and receiving parts). As a result, different functional levels are defined on the coupling, so that the top pin part or receiving part defines one functional level and the bottom pin part or receiving part defines the other functional level. This divides the functions of torque drive and clamping into different axial subsections. This has the particular advantage that the corresponding surfaces of the coupling pins and of the coupling pin receptacle can be optimized for the individual functions. In addition, the axial pullout safety is also realized by the stop surface, which quasi-separates the two parts, regardless of the functions of torque drive and clamping. Altogether, this results in a coupling optimized with regard to different functions, which allows the various functions to be optimized to the different surfaces.

According to one suitable design, the torque surfaces are formed on the bottom pin part and receiving part, respectively. Because the top part has the groove and/or is formed by the groove, the bottom part generally extends more in the radial direction. Because the greatest possible radial extension is advantageous for transmission of torque, this guarantees an especially effective transmission of torque.

The axial length of the front pin part preferably corresponds to the axial length of the groove; i.e., no other surface of the coupling pin connects to the groove in an axial direction. The transmission areas between the individual functional levels typically merge into one another across at least rounded corner areas. Thus, the cutting part, which in the radial direction juts over the coupling pin while forming a head-bearing surface, connects directly onto the groove forward in the axial direction. Thus in particular, the groove merges into a rounding in the head-bearing surface. On the opposite side, the groove preferably also merges into the stop surface via a curve. Each stop surface in turn preferably also passes over a curve or via a chamfer in the lateral surface of the rear pin part. The rear pin part is in turn limited by a bottom pin base, which preferably is formed by a horizontal surface. The lateral surface of the rear pin part preferably also passes over a curve or a chamfer in the pin base.

In one suitable design, the groove extends in a peripheral direction and thus transverse to the axial direction. Thus, it is not inclined with regard to the axial direction and in particular does not have a helical shape.

The groove suitably extends in a peripheral direction around the entire coupling pin, except for any recesses caused by flutes, which are formed in the cutting head and cut the coupling pin. In one preferred embodiment, flutes are formed, namely in the cutting head, which are aligned with flutes of the support. These flutes also typically extend into the coupling pin, thus cutting them.

As a result of the fully circular groove, corresponding stop surfaces—except for interruptions caused by the flutes—are preferably fully circular also. Thus, the stop surfaces extend along sides of the support over the entire fastening bar. The two fastening bars are separated from each other on the support side by the flutes.

Alternatively, the groove only extends over a partial area of the fastening bars and thus also only over a partial area of the coupling pin. Preferably, the stop surface joins the torque surfaces in a peripheral direction.

In the inserted state, it is not absolutely necessary that the corresponding stop surfaces directly abut one another or are even clamped together. In principle, a slight gap between the stop surfaces is possible. The pullout safety formed by the stop surfaces is intended, when the rotary tool withdraws, for example, from a bore hole, to prevent the cutting head from being pulled out from the support.

In one preferred embodiment, the stop surface preferably extends according to a first embodiment perpendicularly in the axial direction and thus in the horizontal direction. Thus, the stop surfaces form a common horizontal plane inside of which the stop surfaces are arranged.

Alternatively, the stop surfaces are preferably arranged at an incline to the axial direction. In general, the stop surfaces are spread out by a direction along the periphery of the coupling pins and in a transverse direction. The transverse direction extends outward from the axis of rotation in the direction of the periphery. This transverse direction is inclined under the first angle of inclination with regard to the axial direction. The first angle of inclination is specifically not 90°; i.e., the transverse direction and thus the stop surfaces do not extend perpendicular to the axial direction.

The first angle of inclination preferably ranges from 30° to 85° and in particular ranges from 50° to 75°. Accordingly, the stop surface is thus inclined opposite a horizontal plane at an angle from 5° to 60° and in particular at an angle from 40° to 15°. Correspondingly, the support-side stop surface is also inclined at the same angle of inclination, so that the corresponding stop surfaces extend parallel to one another. The inclination of these stop surfaces is technically favorable for manufacture. To connect the groove to the coupling pin, typically a grinding wheel is used. Grinding the groove simultaneously forms the stop surfaces. The short axial length of the groove makes it necessary to use comparatively thin grinding wheels. The position of inclination makes it possible to use thicker grinding wheels.

At least one type of function surface on the peripheral side, and preferably both types of function surfaces on the peripheral side, extend parallel to the axial direction. In particular, the peripheral-side function surfaces do not form in the axial direction an effective pullout safety; i.e., none of the peripheral-side function surfaces is inclined in such a way that a positive pullout safety is formed in the axial direction. Thus, viewed from the axial direction (seen from back to front), no peripheral is formed between the support-side and the peripheral-side function surfaces.

As an alternative to the design in which the two function surfaces extend parallel to the axial direction, a type of peripheral-side function surfaces is inclined at a second angle of inclination with regard to the axial direction. Each peripheral-side function surface is in turn spread out by a direction along the periphery and a longitudinal direction perpendicular to it. The longitudinal direction is aligned at the second angle of inclination with regard to the axial direction. The second angle of inclination preferably ranges from 10° to 45° and in particular ranges from 20° to 30°.

Preferably, this function surface is inclined in such a way that it is inclined contrary to the axial direction on the axis of rotation; i.e., viewed in the axial direction, no positive pullout safety is formed with the fastening bars.

This inclined function surface is preferably a torque surface. Inclining the torque surface improves the force transmission between the coupling pins onto the fastening bars. The inclination transmits torque onto the support also in the axial direction. This reduces the load of the fastening bars in the transverse or radial direction. In combination with the arrangement of the torque surfaces in the rear part, this also guarantees an altogether reliable transmission of high torques.

Altogether, the coupling pin is preferably roughly rectangular and has a pair of opposite-facing convex, i.e. outwardly curved, front sides as well as a pair of opposite-facing long sides extending specifically in a straight line. In one embodiment in which the pin is cut by flutes, each long side is interrupted by a respective clamping slot. At the same time, the flutes are in each instance arranged in a roughly diagonal manner and facing the coupling pin. The torque surfaces are also formed specifically on the longitudinal surfaces and the clamping surfaces are formed on the front sides. This rectangular embodiment with long sides that are oriented at an angle with regard to the peripheral direction or direction of rotation of the rotary tool makes possible effective transmission of torque across the long sides.

Advantageously, the two parts, i.e. the rear and the front top pin part or receiving part, extend in an axial direction, preferably over a comparable length. This makes the different functions available in roughly the same lengths for the function zones. "Comparable length" means in this connection that the lengths of the two parts differ by no more than 30%, preferably by no more than 10%. Most preferably, they are identical.

In one preferred embodiment, as an alternative to allocating the function surfaces to the two pin parts, both types of function surfaces are formed on the rear pin part. This makes possible a shorter pin length or if the pin length is the same, a greater length of the rear pin part compared to allocating the two function surfaces to the two pin parts, because the groove can now be made much smaller. Therefore, in this case the groove specifically and exclusively serves to form the stop surfaces.

Preferably, the groove length, i.e. the length of the groove in the axial direction, is only 0.3 to 0.5 times the axial length of the pin part.

The coupling pin generally has a pin length that extends from the already mentioned head-bearing surface up to the pin base. Accordingly, the coupling pin receptacle also has a length that is defined by the distance between the front contact surfaces of the fastening bars and a base of the coupling pin receptacle. According to a first preferred variant, the two lengths are coordinated in such a way that in the joined state the head-bearing surface of the cutting head rests on the front contact surfaces and a slight distance (gap) is formed between the base of the coupling pin receptacle and the pin base. Thus, in this variant the pin length is shorter than the length of the accommodation.

In a second preferred embodiment, in the combined state the coupling pin and its pin base are supported on the base of the mounting. Therefore, in this case the pin length is greater than the length of the mounting. In the second design variant, therefore, a slight gap is formed between the front contact surfaces and the head contact.

The distance, i.e. the difference between the two lengths, is preferably no more than in the range of less than one hundredth of a millimeter. However, in principle, a greater distance can be set.

In one suitable design, in each instance cut-outs are made on the base of the coupling pin receptacle in the transition area from the inner peripheral surfaces to the base. In this connection, a "cut-out" means a kind of depression, so that a hypothetical cutting plane of the base (extending in a horizontal direction) is cut in the longitudinal direction (and thus at a hypothetical lengthening of the inner peripheral surface) of the bottom receiving part of a clearance.

The clearance preferably extends from the start of the fastening bar contrary to the direction of rotation. In so doing, the clearance forms a radius. The clearance reduces in an advantageous manner stresses that occur at the inserted cutting head. The clearance has a positive effect on the elasticity of the fastening bars.

According to a first design variant, the clearance only extends over a partial surface of the fastening bar and, indeed, in particular only over the area of the clamping surfaces. Alternatively, the clearance in a suitable alternative extends over the entire fastening bar.

As a result of the coupling pins, generally a good guide is formed, in particular for forces having a lateral effect on the cutting head, for example in the case of a slight tilting away from the axial direction. At the same time, the coupling pins prevent any tilting of the longitudinal axis of the cutting head in relation to the longitudinal axis of the support.

According to a preferred further development, the coupling pins also have in the rear pin part, i.e. in the area of the torque surfaces, excess with regard to the coupling pin receptacle. In the area of the clamping surfaces, excess is realized for the desired clamping effect of the coupling pins. Rotating the coupling pin therefore somewhat expands the coupling pin receptacle. The additional excess is now also achieved in the rear pin part, so that in the inserted state, there is no distance between the coupling pins and the coupling pin receptacle, or only a small (<5 µm) one. This guarantees a good guide.

Excess" generally means that a nominal width of a coupling pin is greater than a corresponding nominal width of the coupling pin receptacle. In the area of the clamping surfaces, the excess ranges, for example—measured as the distance from the clamping surface to the axis of rotation—from 2/100 to 4/100 mm. The excess in the rear pin part is advantageously smaller than in the front pin part, and in particular is smaller by at least a factor of 2 and preferably by a factor of 2 to 4.

BRIEF DESCRIPTION OF THE DRAWINGS

Exemplary embodiments of the invention are described in detail by the use of figures. In the figures, identically acting parts are given the same reference numbers.

DETAILED DESCRIPTION OF THE INVENTION

Figures 1A, 1B:
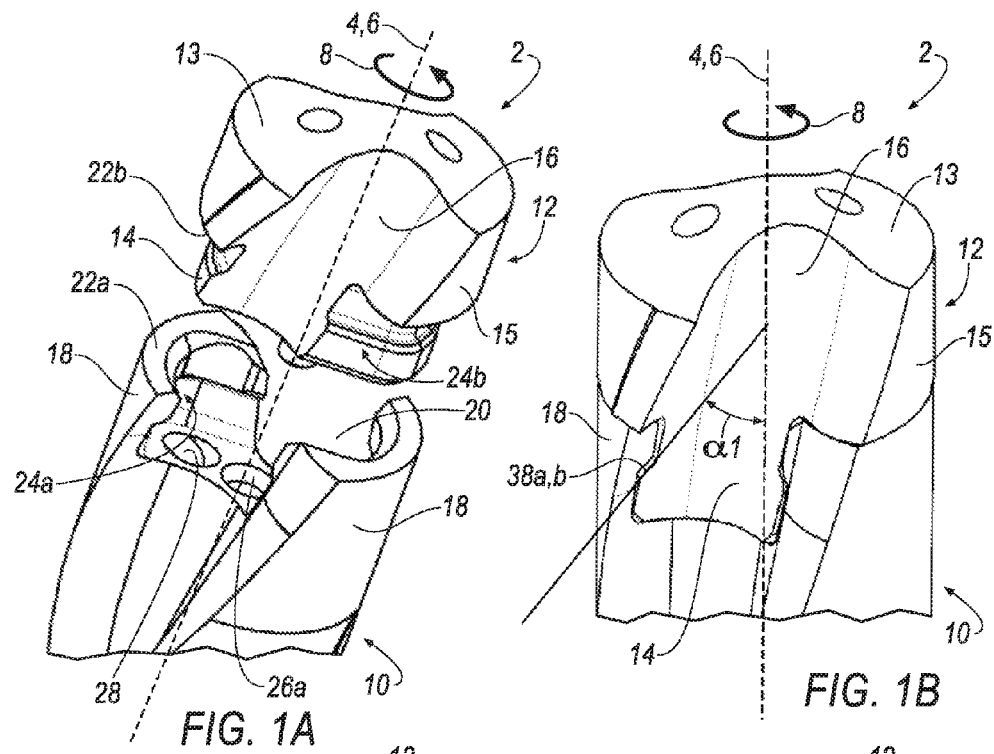
FIG. 1A is a perspective, exploded view of a section of a rotary tool with a support and a cutting head according to a first design variant.
FIG. 1B is a perspective view of a section of the rotary tool according to FIG. 1A where the cutting head is inserted in the support.

The rotary tool 2 shown in the figures is formed as a modular drilling tool. It extends in an axial direction 4 along an axis of rotation 6. Around the axis of rotation 6 rotates the rotary tool 2 during normal operation in the direction of rotation, which at the same time defines a peripheral direction 8.

The rotary tool 2 consists of a support 10 and a cutting head 12 that can be interchangeably fastened to it. The cutting head 12 has a front cutting part 13 and a coupling pin 14 connected to it. The cutting part 13 is limited on the front side by an anterior front surface and in this instance, does not have precisely calculated main cutting edges, which typically are connected to one another in the center of a drill front via a transverse cut and extend radially outward. Main cutting edges are connected to the main free areas on the front contrary to the direction of rotation and peripheral direction 8. On its circumference, the cutting head 12 has a ridge 15 that is interrupted by opposite-facing flutes 16 that start in the cutting head 12 and merge into the support 10. In the exemplary embodiment, the flutes 16 are roughly spiral in shape. The support 10 is a grooved shaft surface in which secondary cutting edges, which extend, for example, along the flutes 16 and start at the cutting head 12, continue. A non-grooved tightening surface is typically attached to a grooved shaft surface of the support 10, with which the rotary tool 2 is clamped into a machine tool.

Elements on the support 10 that correspond to one another are identified below with the letter "a" and on the cutting head 12 with the letter "b."

The support 10 has on its front side two roughly diagonal, opposite-facing fastening bars 18 that are interrupted by the flutes 16. The fastening bars 18 extend in a peripheral direction 8 in each instance across an angular range of approximately 70° to 90°. The front of each fastening bar 18 is limited by flat front contact surfaces 22a, which are arranged in the exemplary embodiment within a common horizontal plane to which the axis of rotation 6 is thus vertically aligned.

The circumference of the coupling pin receptacle 20 is limited by inner peripheral surfaces 24a of the fastening bars 18. It is also limited on its bottom side by a base 25a running horizontally, i.e. perpendicular to the axis of rotation 6. Inserted into this base 25a concentric to the axis of rotation 6 is a centering hole 26a. Also extending in the exemplary embodiment 2 are coolant channels 28 in the support 10, which escape through the bottom surface and align there with corresponding coolant channels 28 of the cutting head 12.

On the inner peripheral surfaces 24a, the support 10 has in each instance torque surfaces 30a and clamping surfaces 32a, which are aligned in the axial direction 4 offset to one another and follow—viewed in a projection in axial direction 4—one another in peripheral direction 8 under an intermediate arrangement of a transition surface. Directly attached to the base 25a are groove-like indentations 36 in the inner peripheral surfaces 24a, which forms a projection. This projection forms on its bottom side aligned to the indentation preferably horizontally extending stop surfaces 38a.

The coupling pin receptacle 20 is divided into two parts, namely a front receiving part 40a and a rear receiving part 42a. The rear receiving part 42a comprises a groove-like indentation 36, which is interrupted by the flutes 16.

Corresponding to the coupling pin receptacle 20, the cutting head 12 has the coupling pin 14, which extends in axial direction 4. The coupling pin 14 is radially offset backwards in a radial direction from the peripheral surfaces of the ridge 15. Corresponding to the coupling pin receptacle 20, the coupling pin 40 has outer peripheral surfaces 24b, on which also are formed torque surfaces 30b and clamping surfaces 32b. These surfaces are aligned in the axial direction 4 offset to one another and follow—viewed in a projection in axial direction 4—one another in peripheral direction 8 under an intermediate arrangement of a transition surface.

The radially offset backwards coupling pin 14 forms in the transitions from the cutting part 13 to the coupling pin 14 a radial projection to the ridge 14, as a result of which two head-bearing surfaces 22b are formed that are in turn arranged in a common horizontal plane and which are separated by the flutes 16.

The coupling pin 14 is divided into two parts, namely a front pin part 40b and a rear pin part 42b. The front pin part 40b comprises a circumferential groove 37, which is interrupted by the flutes 16.

Also formed concentrically to the axis of rotation 6 on the coupling pin 14 is an insertion pin 26b, which is formed solely for use in the support 10 as a first centering aid of the cutting head 12. The cutting head 12 is actually centered by the clamping surfaces 32a and 32b.

Figures 2A, 2B:
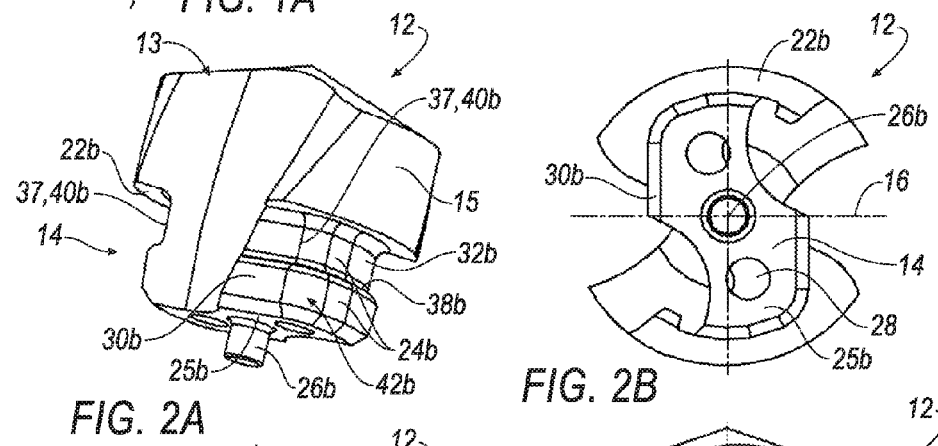
FIG. 2A is a perspective view of the cutting head of the first design variant.
FIG. 2B is a bottom-side view of the cutting head according to FIG. 2A.
Figures 2C, 2D:
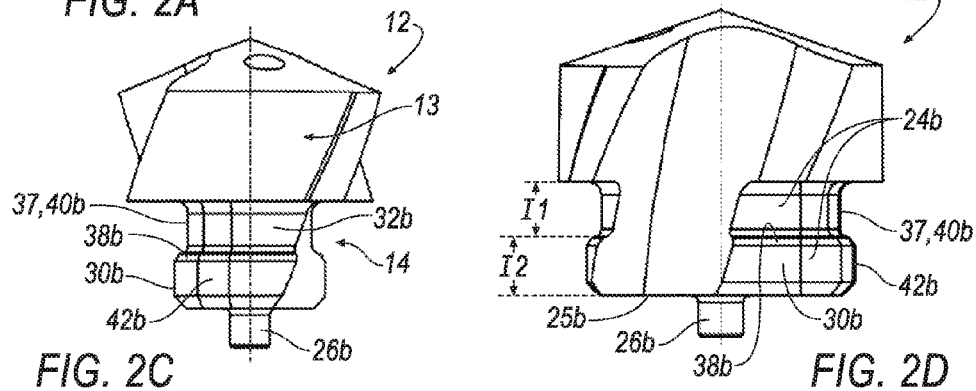
FIGS. 2C, 2D are in each instance side views of the cutting head according to FIG. 2A rotated toward one another at 90°.
Figure 3A:
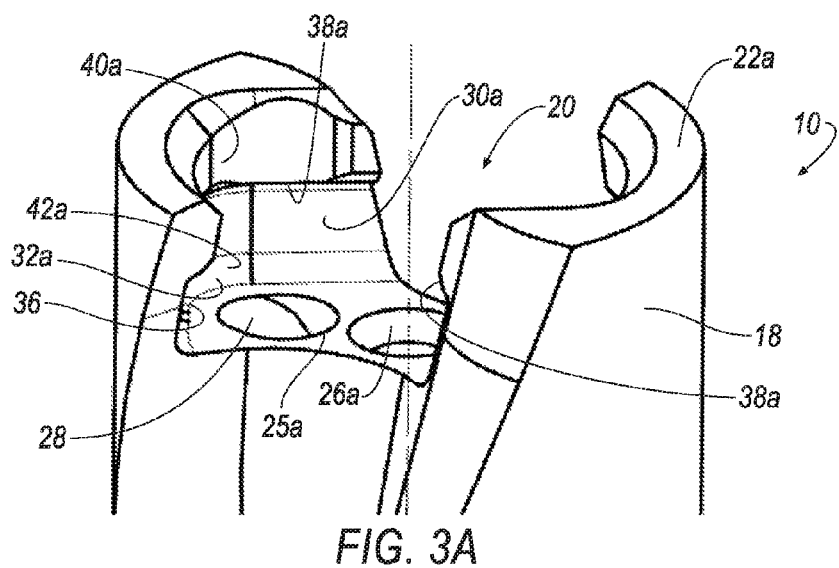
FIG. 3A is a perspective view of a support according to a first design variant for accommodating the cutting head according to FIGS. 2A through 2D for the rotary tool described in FIGS. 1A and 1B.
Figures 4A, 4B:
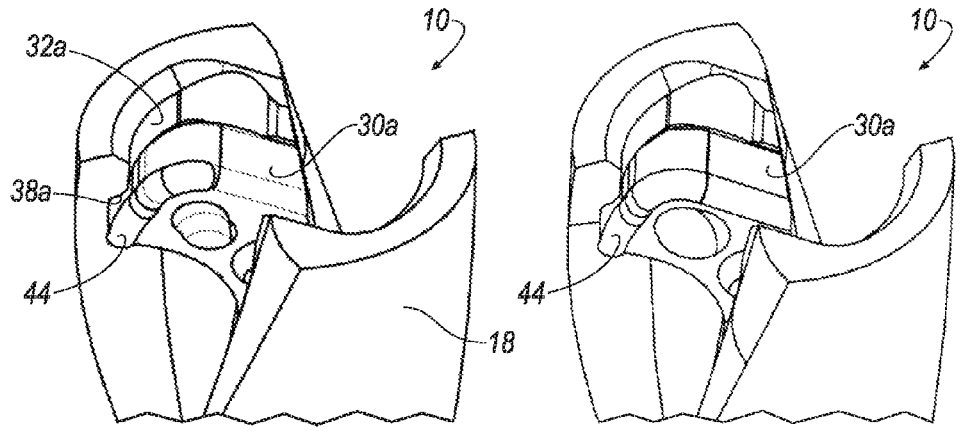
FIG. 4A is a perspective view of the support according to a first alternative with a partially extending clearance.
FIG. 4B is a perspective view of the support according to a second alternative with a clearance that extends over an entire fastening bar.

As is clear in particular from the top views of the cutting head 12 according to FIG. 2A and the top view of the support 10 according to FIGS. 3A and 4A, the coupling pin 40 and the coupling pin receptacle 20 are essentially rectangular and thus have a roughly block-like shape. The coupling pin 14 therefore has, in particular, long sides extending in a straight line and convex, curved front sides, except for, however, diagonal, opposite-facing areas of the long sides of the roughly square transverse surface formed by the flutes 16. Formed on the long sides or narrow sides of this roughly rectangular transverse surface are the torque surfaces 30a and 30b, and formed on the front sides are the clamping surfaces 32a and 32b. The clamping surfaces 32a and 32b extend—for example viewed in a cross-section perpendicular to axial direction 4—along a circular arc or along an elliptical arc. The corner areas of the roughly rectangular transverse surface are rounded off.

In the exemplary embodiments, the groove 37 and the groove-like indentation 36 in each instance extend completely circumferentially and in each instance lead into the flutes 16. The two parts (pin parts and receiving parts) 40a and 40b and 42a and 42b form two function zones or functional levels that are offset to one another in axial direction 4. In the front part 40a and 40b are formed the clamping surfaces 32a and 32b, and in the rear part 42a and 42b are formed the torque surfaces 30a and 30b.

Figure 3B:
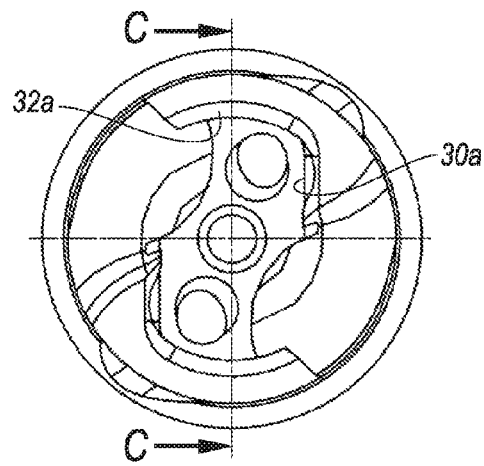
FIG. 3B is a top view of the support according to FIG. 3A.
Figure 3C:
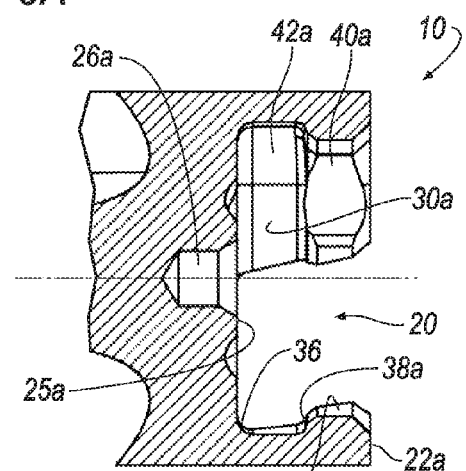
FIG. 3C is a sectional view along lines of intersection C-C in FIG. 3B.
Figure 3D:
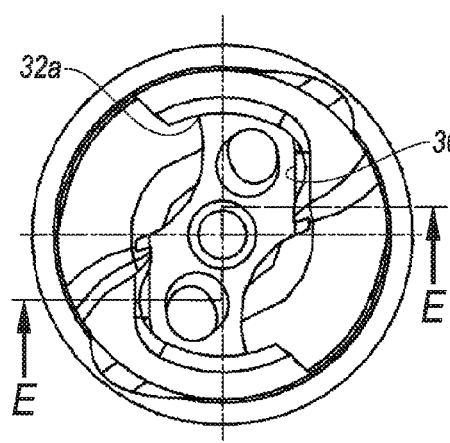
FIG. 3D is a top view of the support according to FIG. 3A.
Figure 3E:
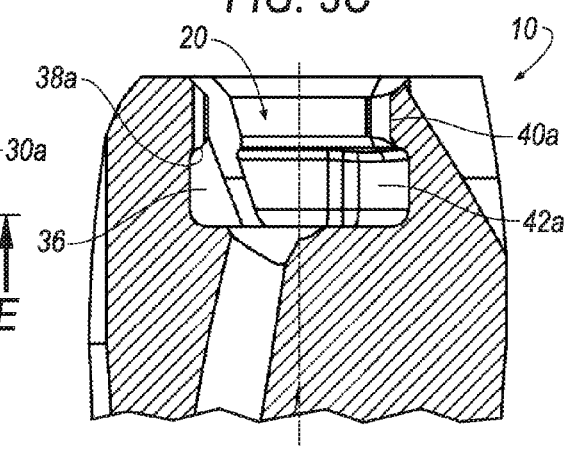
FIG. 3E is a sectional view through the support according to sectional line E-E in FIG. 3D.

As is clear in particular from the top views of FIGS. 2B and 3B, the torque surfaces 30a and 30b are formed on the long sides of the approximately square basic geometry of the coupling pin receptacle 20 and of the coupling pin 14. The clamping surfaces 32a and 32b are on the other hand formed on the front sides of the square basic geometry.

The groove 37 passes—viewed in axial direction 4—on the end side preferably across rounded transition areas in the head-bearing surfaces 22b extending radially outwards and in the backward area passes into the stop surfaces 38b. The groove 37 has a groove length 11 that is defined by the distance between the head-bearing surfaces 22b and the stop surface 38b. At the same time, the groove length 11 also defines in this respect an axial length of the front pin part 40b. In the same manner, the front receiving part 40a also has a length corresponding to the groove length 11.

The rear pin part 42b extends in an axial direction across a part length 12 that is defined by the distance between the stop surfaces 38b and the base 25b. In the same manner, the rear receiving part 42a has a length corresponding to the part length 12.

The part length 12 and the groove length 11 are roughly the same, and preferably identical. They preferably differ by no more than 30%. They generally range, for example in the case of a rotation tool 2 with a nominal diameter of 16 mm, between typically 2 mm and 5 mm, and in particular measure approximately 3 mm (+/−0.5 mm). For other nominal diameters, the respective part length is correspondingly adjusted so that the ratio of nominal diameter to part or groove length remains the same.

In the first exemplary embodiment, according to FIGS. 1 through 4, both the torque surfaces 30a and 30b and the clamping surfaces 32a and 32b extend parallel to the axial direction. Thus, they are not inclined in relation to the axial direction. The stop surfaces 38a and 38b preferably extend under a first angle of inclination, $\alpha 1$, inclined in relation to axial direction 4 (see FIG. 1A). The first angle of inclination, $\alpha 1$, preferably ranges between 30° and 85° and in particular between 50° and 75°. In the exemplary embodiment, the first angle of inclination, $\alpha 1$, is at approximately 70°.

Alternatively, the stop surfaces 38a and 38b extend in a horizontal direction perpendicular to the axial direction.

The stop surfaces 38a and 38b are generally clamped by a direction along the circumference of the coupling pin 14 or of the coupling pin receptacle 20 and a transverse direction that is aligned perpendicular to the direction along the circumference. At the same time, this transverse direction is inclined with regard to axial direction 4 under the first angle of inclination, $\alpha 1$. If a circumferential surface extends along a circular arc line around the axis of rotation 6, the transverse direction will correspond to the radial direction.

The stop surfaces 38a and 38b extend in a longitudinal direction that typically measures a few millimeters, for example 0.5 mm to 2 mm.

The transition areas between various lateral surfaces 30a and 30b, 32a and 32b in an axial direction to the adjacent surfaces 22a and 22b, 38a and 38b, and 25a and 25b, are in each instance rounded or tapered.

FIGS. 4A and 4B show two alternatives for the support 10, in which a clearance 44 is formed in the transition area from the base 25a to the inner peripheral surfaces 24a of the bottom receiving part 42a. To that end, material in the corner and transition area is removed, for example with the help of a grinding wheel or milling head.

In the design variant according to FIG. 4A, the clearance 44, in this instance starting from the clamping slot 16, extends contrary to rotation and peripheral direction 8 only across part of the respective fastening bar 18, and indeed in particular across the area in which the clamping surfaces 32a are formed. In contrast to this, the clearance 44 in the design variant according to FIG. 4B extends across the entire angular range of the fastening bar 18, therefore extending from a clamping slot 16 up to the opposite-facing clamping slot.

Figures 5A, 5B:
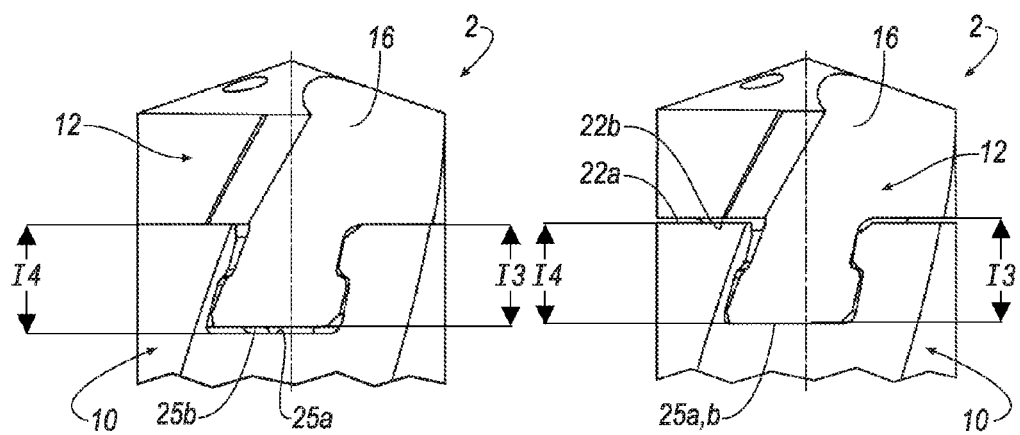
FIG. 5A is a side view of a first embodiment, in which the coupling pin is shorter than the coupling pin receptacle.
FIG. 5B is a side view of a second embodiment, in which the coupling pin is longer than the coupling pin receptacle.

Figures FIGS. 5A and 5B show two different embodiments, in which the two coupling parts (coupling pin 14, coupling pin receptacle 20) in the joined state contact the front or head-bearing surfaces 22a and 22b (FIG. 5A) once and the bottom surfaces (pin base 25a, base 25b, FIG. 5B) once. Both embodiments can also be constructed like the first design variant.

Figures 6A, 6B:
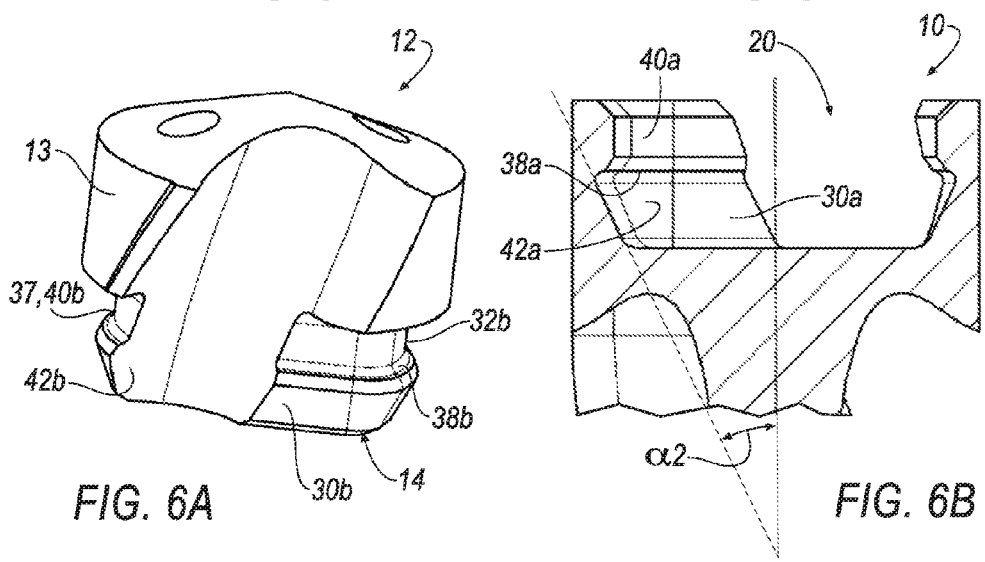
FIG. 6A is a perspective view of the cutting head of a second design variant of the rotary tool.
FIG. 6B is a sectional view of the support of the second design variant for accommodating the cutting head according to FIG. 6A.
Figure 7A:
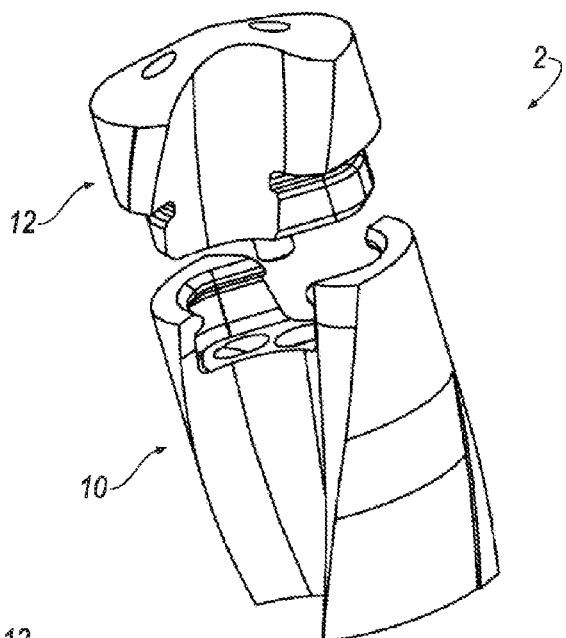
FIG. 7A is a third variant of the rotation tool as shown in perspective.
Figure 7B:
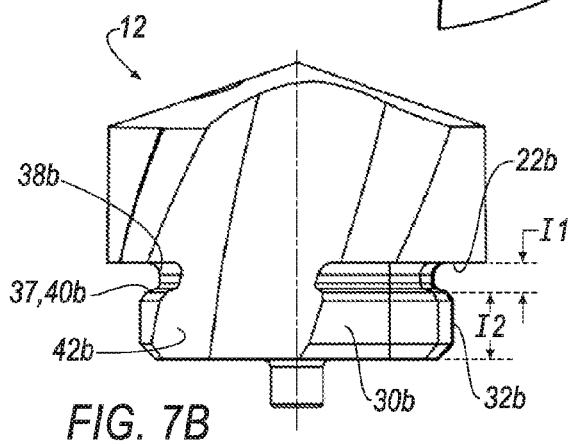
FIG. 7B, C is a side view and a bottom-side top view of a cutting head of the third variant of the rotation tool according to FIG. 7A.
Figure 7C:
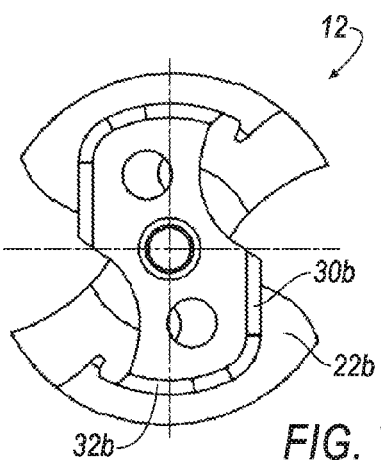
FIG. 7D, E is a top view and a sectional view along the cutting line E-E in FIG. 7D of the support of the third variant of the rotation tool according to FIG. 7A.
Figure 7D:
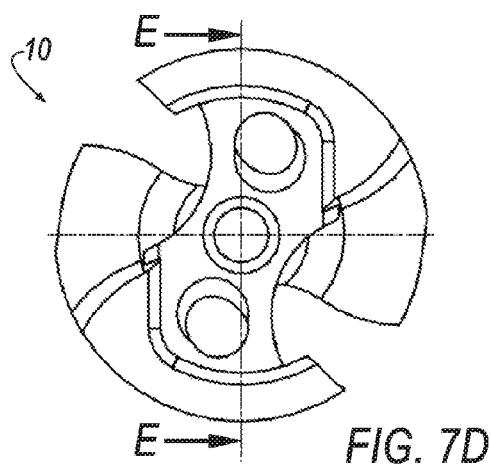
Figure 7E:
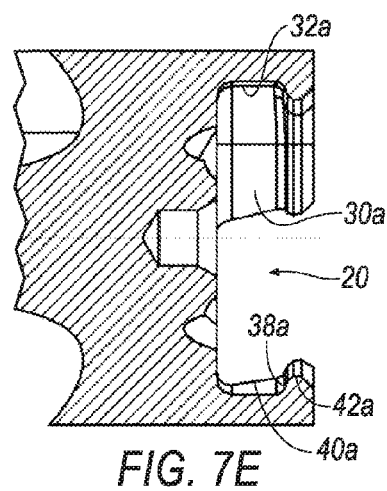

A second design variant of the rotary tool 2 is shown in FIGS. 6A and 6B. The basic difference with regard to the first design variant according to FIGS. 1A and 1B is that the rear pin part 42b and the rear receiving part 42a are aligned together at an oblique incline with regard to axial direction 4; they taper off contrary to axial direction 4. In addition, in the case of this design variant, no centering hole 26a or centering pin 26b is shown. Otherwise, the second design variant corresponds to the first design variant. With regard to the corresponding features, please refer to the description of the first design variant.

Due to the arrangement of the torque surfaces 30a and 30b in the rear part 42a and 42b, the torque surfaces 30a and 30b are aligned together at an oblique incline with regard to axial direction 4 under a second angle of inclination, $\alpha 2$ (see FIG. 6B). This second angle of inclination, $\alpha 2$, preferably ranges from 10° to 45° and in particular ranges from 20° to 30°. In the exemplary embodiment, the second angle of inclination, $\alpha 2$, is approximately at 25°. The oblique torque surfaces 30a and 30b improve the transmission of force in axial direction 4 into the support 10. The torque surfaces 30a and 30b and generally the inner peripheral surfaces 24a are in general clamped by a direction along the circumference and a longitudinal direction aligned perpendicular to it. This longitudinal direction is aligned with regard to axial direction 4 under the second angle of inclination, $\alpha 2$. If the second angle of inclination, $\alpha 2$, is zero, the longitudinal direction extends parallel to the axial direction.

For assembling the cutting head 12, it first is inserted forward into the coupling pin receptacle 20 in axial direction 4 along with its coupling pin 14. In this connection, it is, in contrast to the position shown in FIGS. 1A and 1B, rotated by approximately 90°. For this first axial insertion, the insertion pin 26b provides a first centering support. Then, the entire cutting head 12 is rotated contrary to rotation and peripheral direction 8 around the axis of rotation 6 within the coupling pin receptacle 20. In this connection, the stop surfaces 38a and 38b form a positive rear grip for an axial pullout safety. The clamping surfaces 32a and 32b also form a press fit and thus a clamp. In this connection, a radial clamping force is applied to the clamping surfaces 32a and 32b from the fastening bars 18 onto the coupling pin 14. In the end position, the corresponding torque surfaces 30a and 30b also come to rest together. In operation, force applied from the support 10 is transmitted via the torque surfaces 30a and 30b onto the cutting head 12.

In the assembled end position, according to the first embodiment shown in FIG. 5A, the head-bearing surfaces 22b lie flat on the front contact surfaces 22a. According to the second embodiment, the pin base 25b lies on the base 25a. To that end, the coupling pin 14 has a pin length 13 and the coupling pin receptacle 20 has a length 14. In the first embodiment, the pin length 13 is shorter than the length 14. In the second embodiment, it is the reverse.

Altogether, an extremely reliable coupling between the cutting part 12 and the support 10 is realized by the design described herein containing the function surfaces separated into different axial function zones, namely torque surfaces 30a and 30b and clamping surfaces 32a and 32b, as well as the separately formed axial pullout safety in the form of the stop surfaces 38a and 38b.

A further, third design variant is shown in FIGS. 7A through 7E in which, in contrast to the preceding variants, both the torque surfaces 30a and 30b and clamping surfaces 32a and 32b are formed on the rear pin part 42b or on the rear receiving part 42a. These surfaces are therefore arranged at the same axial height, but are offset to one another in the peripheral direction 8. The roughly rectangular transverse surface geometry is maintained in the design variants described above. The torque surfaces 30b are thus adjusted to the front sides of the coupling pin 14 on the longitudinal sides and to the clamping surfaces 32b.

In this design variant, the groove 37 has a significantly shorter groove length 11 that preferably ranges from 0.3 to 0.5 times the part length 12. Thus, the part length 12 is generally significantly greater (by at least a factor of 2) than the groove length 11. This makes possible, compared to the preceding exemplary embodiments, on the one hand a short pin length 13, or the part length, 12 and thus the length of the function surfaces 30a and 30b and 32a and 32b, can be increased.

As in the preceding exemplary embodiments, the groove 37 connects directly to the head-bearing surface 22b. The stop surfaces 38b in turn extend perpendicular to the axial direction 4 or inclined in relation to it. The coupling pin receptacle 20 is also formed in accordance with the design of the coupling pin 14.

The patents and publications referred to herein are hereby incorporated by reference.

Having described presently preferred embodiments the invention may be otherwise embodied within the scope of the appended claims.

What is claimed is:

1. A cutting head for a rotary tool extending in an axial direction along an axis of rotation, comprising:
   a front cutting part;
   a coupling pin having an outer peripheral surface, the outer peripheral surface divided into a front pin part and a rear pin part, the front pin part comprising a circumferential groove; and
   a stop surface for preventing axial pullout of the cutting head in the axial direction,
   wherein the coupling pin includes a torque surface formed on the rear pin part, and
   wherein the coupling pin includes a clamping surface formed on the circumferential groove of the front pin part, and
   wherein the clamping surface has an angle of inclination of zero degrees with respect to the axis of rotation;
   wherein, when viewed with respect to a plane transverse to the axis of rotation:
      the clamping surface is curved and defines an arc; and
      at least a portion of the torque surface is disposed radially inwardly with respect to the arc defined by the clamping surface.

2. The cutting head according to claim 1, wherein the circumferential groove extends transverse to the axial direction.

3. The cutting head according to claim 1, wherein the stop surface is formed at a first angle of inclination at an incline to the axial direction.

4. The cutting head according to claim 3, wherein the first angle of inclination ranges from 30° to 85°.

5. The cutting head according to claim 4, wherein the first angle of inclination ranges from 40° to 60°.

6. The cutting head according to claim 1, wherein the stop surface extends circumferentially, except for any interruption by a flute surrounding the coupling pin in a peripheral direction.

7. The cutting head according to claim 1, wherein the torque surface is formed with a second angle of inclination with respect to the axis of rotation.

8. The cutting head according to claim 1, wherein the front pin part has a first length in the axial direction, and wherein the rear pin part has a second length in the axial direction, and wherein the first length is identical to the second length.

9. The cutting head according to claim 1, wherein the circumferential groove has a groove length and the rear pin part has a part length, wherein the groove length ranges from 0.3 to 0.5 times the part length.

10. A rotary tool extending in an axial direction along an axis of rotation, comprising:
a support, comprising:
a pair of opposing fastening bars, each fastening bar having an inner peripheral surface defining a coupling pin receptacle, the inner peripheral surface divided into a front receiving part and a rear receiving part, the rear receiving part comprising a groove-like indentation; and
a cutting head capable of being received in the coupling pin receptacle of the support, the cutting head comprising:
a front cutting part;
a coupling pin having an outer peripheral surface, the outer peripheral surface divided into a front pin part and a rear pin part, the front pin part comprising a circumferential groove; and
a stop surface for preventing axial pullout of the cutting head in the axial direction,
wherein the coupling pin includes a torque surface formed on the rear pin part, and
wherein the coupling pin includes a clamping surface formed on the circumferential groove of the front pin part, and
wherein the clamping surface has an angle of inclination of zero degrees with respect to the axis of rotation;
wherein, when viewed with respect to a plane transverse to the axis of rotation:
the clamping surface is curved and defines an arc; and
at least a portion of the torque surface is disposed radially inwardly with respect to the arc defined by the clamping surface.

11. The rotary tool according to claim 10, wherein a first type of function surface is formed on the front receiving part and a second type of function surface is formed on the rear receiving part.

12. The rotary tool according to claim 10, wherein the coupling pin has a pin length, and wherein the coupling pin receptacle has a coupling pin receptacle length.

13. The rotary tool according to claim 12, wherein the pin length is equal to the coupling pin receptacle length.

14. The rotary tool according to claim 12, wherein the pin length is shorter than the coupling pin receptacle length.

15. The rotary tool according to claim 12, wherein the pin length is greater than the coupling pin receptacle length.

16. The rotary tool according to claim 10, wherein the torque surface is formed with a second angle of inclination with respect to the axis of rotation.

17. The cutting head according to claim 1, wherein, when viewed with respect to a plane transverse to the axis of rotation, the clamping surface is convexly curved.

18. The cutting head according to claim 17, wherein, when viewed with respect to a plane transverse to the axis of rotation, the arc is circular or elliptical.

19. The cutting head according to claim 1, wherein, when viewed with respect to a plane transverse to the axis of rotation, the torque surface is straight.

20. The cutting head according to claim 1, comprising:
a flute disposed in the coupling pin;
wherein the torque surface terminates at the flute.

* * * * *